Dec. 21, 1965 J. E. DIETZGEN ETAL 3,224,354

APPARATUS FOR MAKING COPIES ON RAY SENSITIVE SHEETS UPON EXPOSURE TO ULTRAVIOLET AND INFRARED RADIATION

Filed July 7, 1960

INVENTORS:-
JOSEPH E. DIETZGEN
HUBERT J. THOMISZER
BY: Marzall, Johnston, Cook & Root
ATTORNEYS 3,224,354

APPARATUS FOR MAKING COPIES ON RAY SENSITIVE SHEETS UPON EXPOSURE TO ULTRAVIOLET AND INFRARED RADIATION

Joseph E. Dietzgen, Highland Park, and Hubert J. Thomiszer, Skokie, Ill., assignors to Eugene Dietzgen Co., Chicago, Ill., a corporation of Delaware Filed July 7, 1960, Ser. No. 41,291
4 Claims. (Cl. 95—77.5)

The present invention relates in general to the production of copies of graphic material, such as typewritten and other written or printed material, photographs, drawings, tracings, sketches, memoranda and the like; and the invention has more particular reference to apparatus and related methods for the production of copies upon ray sensitive copying sheets.

The invention contemplates the rapid production of copies of graphic material directly from an original or master to be reproduced, it being merely necessary to form an exposure sandwich by superposing the master and a sensitized copying sheet, and by then exposing the sandwich to radiation containing infrared rays, such as are emitted by conventional infrared radiators or lamps, such rays being applied to the graphic material to be reproduced, either through the master upon which the material is carried, or through an overlying copying sheet. The radiation accordingly may be absorbed by the graphic material to be reproduced and converted to heat at the localized areas of the master in which the graphic material is carried, to the end that such heat may be applied directly upon those areas of the sensitive copying sheet which face or register with the graphic material carrying areas of the master and thus develop such registering areas to form a permanently visible copy of the graphic material. The copying sheet may then be treated, as by exposing the same to ultraviolet radiation, or to visible light, such as ordinary sunshine, or to rays emitted by conventional mercury vapor lamps, in order to desensitize or inactivate the heat sensitive material remaining in the copying sheet as a background surrounding the heat developed copy areas.

The invention also contemplates the possibility of irradiating the sensitized copying sheet with ultraviolet rays applied through the master, prior to heat development of a permanently visible image in the sheet, to thereby deactivate the sensitive material of the copying sheet, except in areas corresponding with and screened by the graphic material to be reproduced, the so exposed copying sheet being then heated in order to develop the heat sensitive material remaining in such screened areas as a visible copy of the graphic material of the master. The production of copies, in accordance with the teachings of the present invention, entirely avoids the time delay and inconvenience normally encountered in copying procedures requiring the successive exposure of the copying sheet to light, and the immersion thereof in a liquid developing medium.

An important object of the present invention is to provide apparatus and improved methods for using a sheet of ray sensitive material to produce a facsimile of a graphic master without having to immerse the sheet in a liquid developing solution, development being accomplished merely by heating the sheet in any convenient manner, as by exposing it to the action of heat produced in and emitted by the graphic material to be copied; a further object being to develop the copying sheet as a permanently visible print by stacking it with the master to form an irradiation sandwich and then applying infrared radiation to the sandwich in order to generate heat, in the graphic material containing areas of the master, at temperatures high enough to develop images of such graphic material in the registering areas of the copying sheet; a still further object being to provide for exposing the copying sheet, either before or after heat development thereof, to the action of ultraviolet radiation, in all background areas thereof, that is to say, all areas other than the copy areas corresponding with the graphic material to be reproduced, in order to desensitize, destroy, or otherwise inactivate the heat sensitive component of the copying sheet in said background areas.

Another important object is to provide for copying a graphic master by exposing a copying sheet, containing a light sensitive diazo compound together with a heat activated diazo developing medium, to heat produced in the graphic material carrying areas of the master to be copied, to thereby develop, to highly visible and completely stable condition, the diazo material contained in the areas of the copying sheet which correspond with the heated graphic material carrying areas of the master; a further object being to expose the sensitive copying sheet, either before, during or after the application of developing heat thereto, to the action of diazo material destroying rays, such as ultraviolet radiation, in order to destroy or otherwise desensitize the diazo compound in all areas of the copying sheet other than those corresponding with the material to be copied.

Another important object is to provide for copying a graphic master by exposing a copying sheet selectively to the action of heat and of diazo destroying or inactivating radiations in order to produce developed diazo images in highly visible and completely stable condition in areas corresponding with graphic material to be copied, while destroying or converting the light sensitive compound to inert, colorless, and hence invisible condition in other areas of the sheet, the sheet containing a light sensitive diazo compound and also a medium, such as urea, which is adapted to decompose when heated above a critical temperature and thereby evolve a diazo developing medium such as ammonia gas.

Another important object is to provide apparatus for delivering a copying sheet and a master to be copied, in superposed, sandwich forming relation, past a suitable source or sources of print producing heat; a further object being to provide for applying diazo destroying or desensitizing radiations to the copy sheet either before, after, or simultaneously with the application thereto of diazo developing heat.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings:

FIGS. 1 and 4 are sectional views taken through an exposure sandwich comprising a sheet of sensitive material and a superposed master in position for print making exposure in accordance with the invention;

FIGS. 2 and 5 respectively illustrate the application of diazo destroying radiation after the application of diazo developing heat to the sensitive sheet component of an exposure sandwich, of the sort shown in FIGS. 1 and 4, in accordance with a preferred mode of practicing the invention;

Figures 1, 2, 3, 4, 5, 6, 7, 8, 9, 10, 11, 12, 13, 14:
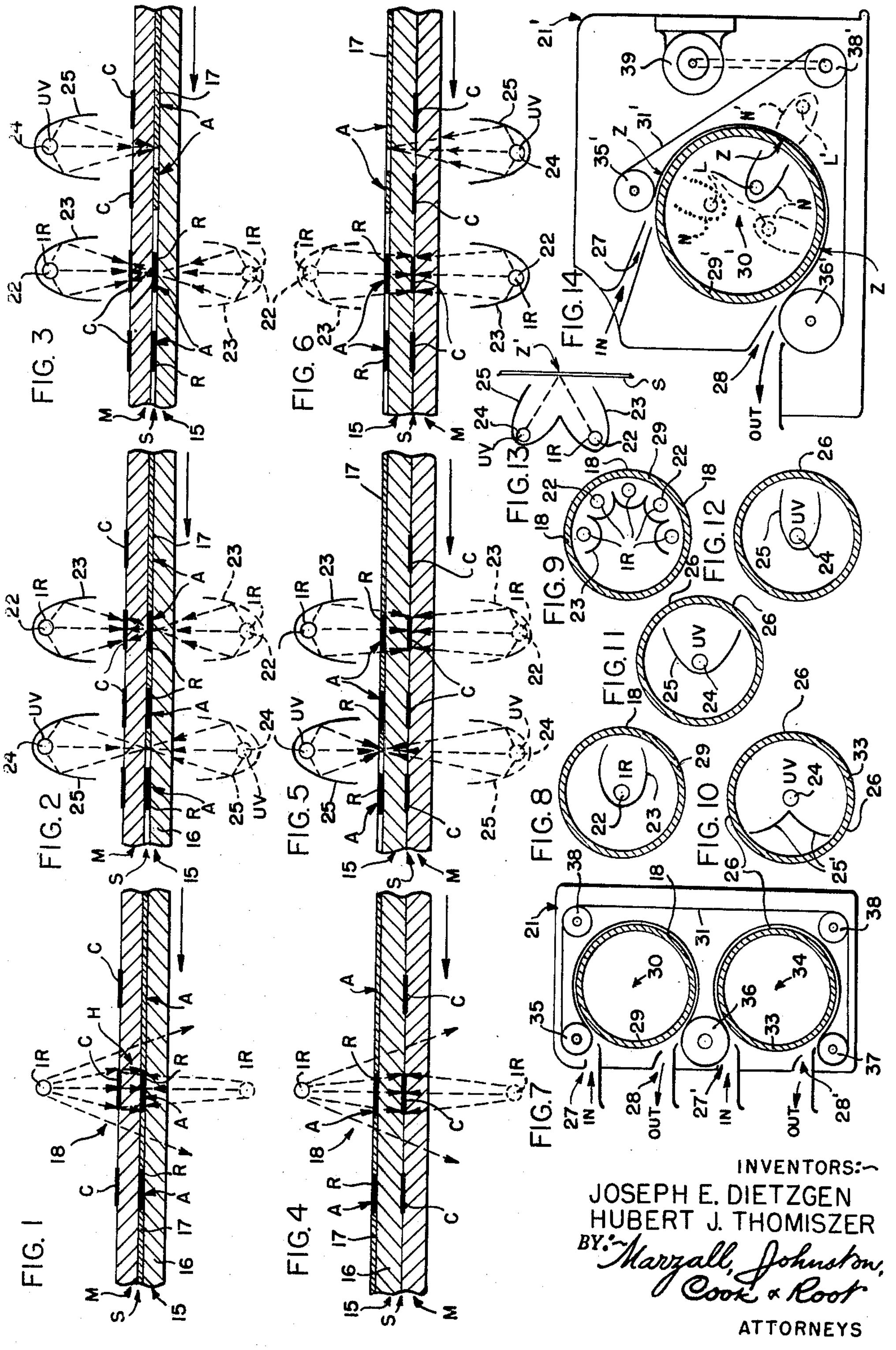
FIGS. 3 and 6 illustrate another method of making prints in accordance with the invention by applying diazo destroying radiation to the sensitive sheet through the master prior to the applicaion of diazo developing heat to the sheet.
FIG. 7 is a sectional view through copying apparatus embodying the present invention.
FIGS. 8 through 12 are views showing various arrangements of radiation emitting components that may be employed in the apparatus shown in FIG. 7.
FIG. 13 is a sectional view through modified copying apparatus embodying the invention.
FIG. 14 is a sectional view through a modified arrangement of radiation emitting components that may be employed in the apparatus shown in FIG. 13.

To illustrate the invention the drawings show ray sensitive sheet material 15, which may conveniently comprise a web 16, such as paper or other suitable sheeting, the web carrying a ray sensitive composition coated thereon as a surface layer 17, such sensitive composition being convertible to highly visible, inert and stable condition upon exposure to heat at temperatures of the order of 300° F. Upon exposure to radiation containing ultraviolet rays, however, the sensitive composition of the layer 17 is convertible to stable condition having color characteristics which differ appreciably from the color condition produced in response to the application of heat to the composition. While the coating 17 may comprise any suitable substance having the foregoing characteristics, the present invention contemplates the employment of a diazo compound and an azo dye coupling component, together with a substance, such as urea, capable of producing an alkaline diazo developing reaction when heated at temperatures of the order of 300° F., in the manner taught in the copending application of Klimkowski, Beauchamp, and Bauer for United States Letters Patent on Diazotype Reproduction Material, filed February 1, 1960, Serial No. 5,688, no claim being herein made for the ray sensitive copy sheet per se.

In making a copy of an original or master M having graphic characters or markings C imprinted or otherwise applied upon a surface thereof, the same may be arranged in superposed or stacked relationship with a copy sheet 15. As shown in FIG. 1 of the drawings, the back face of the master M, remote from the surface thereof upon which the characters C are carried, may be applied upon the surface of the copying sheet 15 which carries the sensitive layer 17. Alternately, the back of the copying sheet, remote from the sensitive layer 17, may be applied upon the character carrying surface of the master, as shown in FIG. 4 of the drawings. In either case, the sandwich may then be disposed in an exposure zone 18 for the application of developing heat at the sensitized surface 17 of the copying sheet 15.

Reproduction material embodying the present invention may be used to make copies of graphic material by exposing the sandwich S to radiation of the sort adapted for absorption by the constituent materials of the graphic representations C to be copied, and hence to be converted to heat at the locus or loci of the graphic representations. Visual light, especially in the orange and red spectral regions, as well as invisible infrared radiation, is capable of absorption by graphite, carbon and similar graphic materials that are commonly employed in printing, typewriting, drawing, photography, and other graphic procedures. As a consequence, copies of graphic material, as shown in FIGS. 1 and 4, may be produced by forming a copying sandwich S in which the master M and a sheet of reproduction material 15 are stacked in fashion permitting the heat produced at the graphic areas C of the master to be applied to registering areas A of the sensitive layer 17 of the copying sheet, in order to heat develop such areas and thus convert the same to stable condition visible by contrast against the surrounding undeveloped portions of the sensitive layer.

To this end, the sandwich S may be exposed to radiation from a source IR of infrared rays or of visible light rays containing orange and red spectral components that are convertible to heat upon absorption by the graphic material of the master to be copied. Such radiation is either absorbed, or is reflected by or passes through any object upon which it impinges. The radiant energy absorbed by the graphic material C is converted to heat, thereby constituting the graphic material C as a source or sources of heat. Such heat, as shown at H, may be transmitted from the graphic material, where it is produced, to the registering areas A of the sensitive layer 17, thereby causing a permanent color change to take place and producing a developed area R duplicating the design formed by the graphic material C in the master or original.

As shown in FIG. 1 of the drawings, in which the exposure sandwich S comprises the master M stacked upon the sensitized layer carrying surface of the copying sheet 15, the radiation source IR is preferably disposed in position to directly irradiate the graphic material carrying surface of the master M. In such arrangement, the generated heat is transferred from the graphic material to the sensitive layer 17 through the body of the master. If desired, the radiation source IR, as indicated in dotted lines in FIG. 1, may be disposed in position to irradiate the back of the sandwich, in which case the radiation may pass through the sensitive sheet 16 and the body of the master M before impinging upon the graphic material C. The sensitive sheet and body of the master, however, particularly where the same comprise thin sheet stock, may indeed absorb minimal radiation quanta without producing heat at a temperature capable of causing development; but substantially all of the radiation will penetrate to the graphic material C and heat the same to a temperature capable of causing development of the areas A of the sensitive layer 17, such developing heat reaching the layer 17 through the body of the master in the manner heretofore described.

Where the exposure sandwich S comprises a sensitized sheet 15 stacked upon the graphic material carrying surface of the master M, as shown in FIG. 4 of the drawings, the radiation source IR may be disposed in position to apply radiation on the graphic material C either through the sensitized sheet 15 as shown in solid lines, or through the body of the master as indicated in dotted lines. In either case, although the radiation, in reaching the graphic material C, is required to pass either through the sensitized sheet 15 or the body of the master M, little, if any, of the radiation will be absorbed in the sheet or in the body of the master, the same being relatively transparent to such radiation. Accordingly, the major portion of the radiation will be applied upon and be absorbed by the graphic material C, thereby constituting the same as a source or sources of heat, whence heat may be delivered upon the areas A of the sensitive layer 17 at temperatures capable of developing such areas.

It should be understood, of course, that radiation of the sort contemplated, in and of itself, is relatively cool and will not heat the sensitive layer 17 sufficiently to develop the same as a visible image merely in response to the passage of rays from the source IR through the layer 17. As a consequence, radiation from the source IR may be freely applied to and through the sensitive sheet 15 without developing an image in or otherwise affecting the sensitive layer 17, development being accomplished only in response to application of heat at temperatures in excess of the temperature required for development.

It should be further understood, of course, that the sensitive material 15 is not completely transparent to radiation of the sort emitted by the source IR and that some radiation will be absorbed in a sheet exposed to such radiation. It is therefore undesirable to expose the sensitive material to the radiation during extended exposure intervals because of the possibility of fogging or partially developing the sheet should it become heated sufficiently to initiate the developing action therein. It is therefore desirable to irradiate the sandwich S during exposure intervals of sufficient duration only to heat the graphic material C to the temperature required to attain development in the registering areas of the sensitive layer 17, and then to terminate the exposure to prevent the remaining or background portions of the layer 17 from becoming heated to layer developing temperature.

In this connection, while it is possible to produce prints of graphic material by irradiating the entire sandwich S uniformly in order to heat all of the graphic material C simultaneously, it is preferable to constitute the source IR as an elongated ray emitter, such as a conventional tubular infrared ray lamp 22 having length of the order of the width of the exposure sandwich, and to provide means for delivering the sandwich transversely past the lamp at a preferably uniform rate of speed so that all of the areas of the sandwich may be exposed uniformly to the radiation emitted by the lamp. It is also desirable to provide a ray concentrating reflector 23 for use in conjunction with the ray emitting lamp in order to apply all of the lamp emitted rays upon the sandwich within a relatively narrow transverse zone or band, at the exposure station or zone 18. As the exposure sandwich S is passed progressively through such a narrow zone of concentrated irradiation, the graphic material C to be reproduced may momentarily be subjected to the maximum heating effect of the concentrated radiation, thereby heating the graphic material C to maximum temperature, without, however, appreciably heating the sensitive copying sheet or the remaining portions of the master. As a consequence, the heated graphic material will develop images R in the layer 17 by transfer of heat therefrom to the registering areas A of the sensitive layer 17, without fogging or otherwise affecting the remaining portions of the sensitive layer.

After development in the sensitive material 16 of copy images R corresponding with the graphic material C of the master, the remaining undeveloped portions of the sensitive layer 17 may, if desired, be rendered inert and hence incapable of later print fogging development upon subsequent exposure to heat at developing temperatures. To this end, the undeveloped diazo compound surrounding and forming a background for the developed images R may be decomposed to a stable colorless condition providing high contrast with the developed images R and rendered inert and incapable of thermally responsive color change. Such stabilization of the undeveloped diazo material of the layer 17 may be accomplished merely by exposing the same to ultraviolet radiations, which may, if desired, be artificial radiations such as are produced by operation of a mercury vapor lamp; or the developed sheet 15 may be exposed to natural ultraviolet radiation of the sort found in ordinary sunlight or sky shine. Indeed, the fact that the developed print may be stabilized merely by exposure to sunlight or other source of ultraviolet radiations is an important advantage in that exposure of the developed print to ultraviolet radiation not only improves the contrast and appearance of the copy, by destroying the undeveloped material and rendering it colorless, in the background areas of the copy, but also by inhibiting the possibility of fogging the print through subsequent exposure thereof to heat. Prior commercial thermographic copies have tended toward progressive deterioration upon exposure to sunlight and other forms of heat.

As shown in FIGS. 2 and 5, an irradiation sandwich comprising a master M stacked upon the sensitized surface 17 of a copying sheet 15, or a sandwich in which the master M is disposed beneath the sensitized sheet, may be first exposed to the action of infrared rays emitted from a tubular lamp 22, forming a ray source IR and directed, by means of a ray concentrating reflector 23, upon either side of the sandwich, as indicated by the solid and dotted line showings, in order to develop stable copy images R in the layer 17 of the copying sheet. Thereafter, the sandwich may be delivered past a preferably tubular lamp 24 forming a source UV of ultraviolet radiation, the lamp being preferably associated with a ray concentrating reflector 25 for directing lamp emitted rays upon the layer 17 of the sensitive copying sheet in order to render inert the undeveloped portions of the layer and thus stabilize the print. The ultraviolet print stabilizing rays may be applied to the sandwich from either side thereof, as indicated in the solid and dotted line showings of the lamp 24 and its associated reflector. If desired, the master M may be separated from the copying sheet 15 immediately after the sandwich has been subjected to the infrared developing rays emitted from the source IR, so as to permit the print to be stabilized by passing it in position to receive stabilizing rays from the source UV directly upon the image carrying layer 17.

Since the graphic material C is capable of absorbing ultraviolet light, it is possible to expose the sandwich S to ultraviolet light prior to development by heat in order to render inert the material of the sensitive layer 17 of the copying sheet except at the areas A corresponding with the graphic material C to be reproduced. Thereafter, the so exposed copying sheet may be exposed to the action of heat in order to develop the sensitive material of the layer 17 which remains in the areas A after exposure of the copying sheet to the action of radiation containing ultraviolet rays applied thereto through the master M as a screen. The foregoing possibility is illustrated in FIGS. 3 and 6, which respectively illustrate the exposure of a sandwich comprising a master stacked upon the sensitized surface 17 of a copying sheet and a copying sheet stacked upon the master. In either case, where copy images are developed after exposure of the sandwich to radiation containing ultraviolet rays, it is essential that the desensitizing radiation be applied to the copying sheet only through the master M, so as to leave unchanged the sensitive material of the layer 17 in the areas thereof which register with the graphic material C to be reproduced.

After exposure of the sensitive copying sheet 15 to the action of radiation containing ultraviolet rays applied thereto only through the master M, the copying sheet may be developed by exposing the sensitive material remaining in the areas A to heat in any suitable or convenient manner, as by exposing the sandwich to the action of infrared radiation in the manner heretofore described, which radiation may be applied to the sandwich from either of its opposite sides, as indicated in dotted and solid lines in FIGS. 3 and 6.

The present invention contemplates suitable apparatus for producing copies of graphic material automatically, such apparatus comprising sheet conveying mechanism for traveling a sandwich S embodying a stacked master M and a sensitive copying sheet 15 past a suitable source of radiation IR for the thermal development of images in the sheet corresponding with graphic material of the master, such apparatus, if desired, being arranged to include a suitable source of ultraviolet radiation past which the heat developed sheet may be traveled, either alone or as a sandwich with the master, in order to stabilize the undeveloped portions of the sensitive sheet. Such apparatus may include suitable housing means 21 enclosing the sheet conveying mechanism together with the source of developing radiation IR as well as a source UV of ultraviolet print stabilizing radiation, where the same is included as a part of the print producing mechanism, the housing means 21 being formed with suitable inlet and outlet slots or openings through which the sheet material, including the master and the copying sheet, may be introduced into and delivered from the apparatus.

The radiation source IR may conveniently comprise a conventional infrared ray emitting lamp 22 of elongated tubular form disposed in the housing 21. A reflector 23 may be provided to apply lamp emitted rays within a narrow zone extending transversely of the path of movement of the sandwich S through the irradiation zone 18. The housing 21 may also enclose a source of ultraviolet radiation for application on the sensitive copying sheet 15 in order to stabilize the same in the background areas of the print, that is to say, the areas of the sheet other than the areas A in which printed images of the material to be copied are to appear in the finished print. The radiation source UV may conveniently comprise a conventional ultraviolet lamp 24 of elongated tubular configuration; and a reflector 25 may be provided for applying lamp emitted ultraviolet rays upon the sensitive copying sheet 15 within a zone of any desired or convenient width through which the sensitive sheet 15 may be caused to move, the width of the ultraviolet exposure zone 26 being not at all critical. The housing 21 may be formed with an inlet slot or opening 27 through which a sandwich S may be delivered to the sheet supporting and carrying means for transfer through the exposure zone 18. The sheet supporting and carrying means may conveniently comprise a drum or roller 29 mounted for turning movement in the housing about an axis of rotation 30, belt means 31 being provided for carrying the sandwich S around the roller and through the radiation zone 18.

As shown more particularly in FIG. 7, the housing may be formed with an outlet opening or slot 28 through which the sandwich S may be delivered from the housing after passing through the zone 18. After discharge from the housing, the components of the exposed sandwich may be separated to permit the developed copying sheet to be reintroduced into the housing through another inlet slot or opening 27' for exposure to print stabilizing ultraviolet radiation. When thus reintroduced into the housing, the developed sheet 15 may be received by a roller 32 and its associated belt means and may travel around and in engagement with the peripheral surface of the roller, through the ultraviolet exposure zone 26, the stabilized sheet being delivered thence through the outlet opening 28'.

The roller 29 may comprise a tubular sleeve of glass, plastic or other material substantially transparent to infrared rays. The sleeve may be supported for turning movement in any suitable, preferred or convenient fashion, and a conventional elongated tubular infrared ray emitting lamp 22 and an associated reflector 23 may be mounted within the tubular member 29 in position to apply infrared rays outwardly through the sleeve to constitute the outer surface thereof, inwardly of the belt 31, as the irradiation zone 18. The sheet supporting and conveying means may also comprise a tubular sleeve 33 mounted within the housing 21 for rotary movement about an axis 34, the sleeve 33 being preferably disposed below the sleeve 29. The sleeve 33 may conveniently comprise glass, plastic or other material that is transparent to ultraviolet rays. The sleeve 33 may be supported for turning movement in any suitable, preferred or convenient fashion, and a conventional elongated tubular ultraviolet lamp 24 may be mounted within the sleeve 33, preferably in coaxial alinement with the turning axis 34, in order to provide a radiation source rich in ultraviolet rays within the housing.

The belt means 31 may comprise an endless element associated with both of the sleeves 29 and 33, said belt being guided on a roller 35 making rolling contact with the peripheral surface of the sleeve 29 opposite the inlet opening 27. The belt 31 extends thence around and in contact with the peripheral surface of the sleeve 29 between the roller 35 and a guide roller 36 which makes contact with the sleeve 29 opposite the outlet opening 28. As a consequence, a sandwich S introduced through the inlet opening 27 and between the roller 35 and sleeve 29 may pass thence between the belt 31 and the peripheral surface of the sleeve 29 through the exposure zone 18, defined between the belt and the sleeve opposite the lamp 22 forming the radiation source IR and the reflector 23 associated with the lamp. Accordingly, as the sandwich is delivered around the sleeve 29 and through the exposure zone 18, the sensitive copying sheet component of the sandwich will be developed in the manner heretofore described, after which the sandwich may be delivered from the housing 21 through the outlet opening 28.

As shown more particularly in FIG. 7 of the drawings, the guide roller 36 may be disposed in rolling contact with the sleeve 33 as well as with the roller 29 intermediate the outlet opening 28 and the re-entry slot 27'. Accordingly, the belt 31, after leaving the sleeve 29 at the outlet opening 28, may pass around the guide roller 36 and may travel thence around the sleeve 33 to a guide roller 37 at the outlet opening 28', whence the belt 31 may be delivered around auxiliary rollers 38 to the guide roller 35. Suitable motive means, such as an electric motor, may be provided for driving the belt 31 and the sleeves 29 and 33, in order to travel the sandwich S through the exposure zone or zones, said motor being drivingly connected with one of the belt carrying guide rollers, such as the roller 37.

After the sandwich has traveled around the sleeve 29 and been delivered outwardly of the casing 21 through the opening 28, the exposed copying sheet 15 may be stripped or otherwise separated from the master M and delivered through the re-entrance slot 27' for delivery thence around the sleeve 33 through the copy stabilizing zone 26 defined between the belt 31 and the periphery of the roller 33. The developed print to be stabilized is preferably delivered with its sensitive layer carrying surface facing inwardly upon the sleeve 33 in position for direct exposure to print stabilizing ultraviolet rays emitted by the ultraviolet ray source lamp 24 through the ray transparent sleeve 33 and into the stabilizing zone 26 defined at the periphery of the sleeve. If desired, the outlet 28 and inlet 27' may be eliminated and the roller 36 may be provided with associated sandwich guiding means for delivering a sandwich directly from the roller 29 to the roller 33.

As an alternate arrangement, the roller 33 and its associated ultraviolet radiation source 24 may be disposed in the casing in position to receive an exposure sandwich introduced into the casing through the inlet opening 27, and the roller 29 and its associated infrared ray source 22 may be disposed in position to receive a sandwich from the roller 33 and to convey the same to the outlet or delivery opening 28'. Such an arrangement, of course, will provide a convenient means for developing images in the sensitive sheet after exposure thereof to stabilizing rays applied to the sheet through the master, in the manner shown in FIGS. 3 and 6.

As shown in FIG. 8 of the drawings, the elongated tubular lamp 22 forming a source of infrared radiation may be disposed coaxially within the sleeve 29 in association with a reflector 23 shaped to concentrate lamp emitted rays within a narrow band to form the exposure zone 18 at the outer surface of the sleeve 29, such arrangement being particularly well suited for heating the graphic material C in performing the invention in the manner depicted in FIGS. 2 and 5.

As shown in FIG. 9, a plurality of tubular lamps 22 may be disposed in spaced apart relationship around and within the sleeve 29 in association with reflector means 23 shaped to direct lamp emitted rays within a relatively wide zone 18, subtending, in the illustrated embodiment, an angle of the order of 120° about the axis of the sleeve, such arrangement being suitable for developing print images in the copying sheet following exposure thereof to ultraviolet rays applied through the master M in the manner shown in FIGS. 3 and 6.

As shown in FIGS. 10, 11 and 12, a tubular lamp 24, forming an elongated source of radiation rich in ultraviolet light, may be mounted coaxially within the sleeve 33 in association with a reflector 25, which, as shown in FIG. 10, may be formed to direct lamp emitted radiation within a wide zone 26 subtending an angle of the order of 250° with respect to the axis of the sleeve at the outer surface thereof. As shown in FIG. 11, however, the reflector 25 may be formed to deliver lamp emitted radiation within a zone 26 subtending a lesser angle of the order of 90°. The reflector arrangements shown in FIGS.

10 and 11 may be conveniently employed where stabilizing radiation from the lamp 24 is applied directly upon the surface of a copying sheet. Where the stabilizing rays, however, are required to penetrate the master or the body of the copying sheet before reaching the sensitive layer 17 thereof, the reflector 25 may be shaped as shown in FIG. 12 in order to concentrate the radiation within a narrow band to form an exposure zone 26 subtending an angle of the order of 5° at the surface of the sleeve 33.

The print producing machine illustrated in FIG. 14 comprises a sleeve 29′ mounted within a housing 21′ for turning movement about an axis 30′, endless belt means 31′ being provided for carrying an exposure sandwich S on the sleeve 29′. The housing 21′ may be formed with an inlet opening 27, through which an exposure sandwich may be delivered to the carrying means for transfer thence around the axis of the sleeve 29′, and the housing may also be provided with an outlet opening 28, through which the sandwich may be delivered from the housing after passing from the sleeve 29′. The endless belt 31′ may be guided on a roller 35′ making rolling contact with the peripheral surface of the sleeve 29′ opposite the inlet opening 27. The belt may extend thence around and in contact with the peripheral surface of the sleeve 29′, between the roller 35′ and a guide roller 36′ which makes contact with the sleeve 29′ opposite the outlet opening 28. From the roller 36′ the endless belt 31′ may be returned to the roller 35′ around a roller 38′, which may be drivingly connected with suitable motive means, such as an electric motor 39, to thereby provide for driving the belt 31′ and the sleeve 29′. If desired, suitable sandwich operated switch means may be provided at the inlet opening 27, and, if necessary, at the outlet opening 28 for energizing the motor 39 upon delivery of a sandwich into the inlet opening 27 and until the sandwich shall have been ejected through the outlet opening 28.

The sleeve 29′ may conveniently comprise glass, plastic or other suitable ray transparent material, and the endless belt 31′ may comprise any suitable or preferred flexible material adapted to drivingly engage the sleeve 29′ and to hold sandwich components firmly against the outer surface of said sleeve. The sleeve 29′ is sized to receive therein one or more radiation lamps L in position to emit rays outwardly through the sleeve 29′ and into an irradiation zone or zones Z at the outer surface of the sleeve and within the belt 31′. The lamp or lamps L may each be associated, within the sleeve 29′, with a suitably shaped ray reflector N for directing lamp emitted rays through the sleeve and into a corresponding irradiation zone Z.

If desired, a single lamp of the sort adapted to emit infrared rays may be disposed with an associated ray concentrating reflector N within the sleeve 29′, as in the position illustrated in solid lines in FIG. 14, so as to develop print images R in the sensitive layer 17 of the copying sheet component of a sandwich delivered to the sleeve 29′. If desired, a lamp of the sort adapted to produce radiation rich in ultraviolet rays may also be mounted within the sleeve 29′, together with the infrared ray emitting lamp, in order to irradiate the sandwich either before or after exposure thereof to image developing infrared rays. To these ends, a tubular ultraviolet ray emitting lamp may be mounted with or without an associated reflector, in the position shown in dotted lines in FIG. 14, in order to apply radiation containing ultraviolet rays upon the sandwich before it is exposed to infrared rays. By mounting the ultraviolet ray emitting lamp with or without an associated reflector in the position shown in dot-and-dash lines in FIG. 14, the radiation sandwich may be exposed to ultraviolet rays for the stabilization of the print after the same shall have been exposed to print developing infrared rays. If desired, the ultraviolet lamp may be mounted within the sleeve 29′, with or without a reflector, in any position outwardly of the reflector N of the infrared ray emitting lamp, in order to apply radiation containing ultraviolet rays to the sandwich both before and after exposure thereof to print developing infrared radiation. In this connection, the ultraviolet lamp may be mounted in the sleeve 29′ together with a reflector of the sort shown at 25 in FIG. 10.

It is also within the contemplation of the present invention to apply ultraviolet and infrared radiation upon an irradiation sandwich contemporaneously in order simultaneously to develop and stabilize the print. To this end, as shown in FIG. 13, infrared and ultraviolet ray emitting lamps 22 and 24 may be mounted in position each with an associated ray directing reflector 23 and 25 positioned to direct infared and ultraviolet rays upon the radiation sandwich in a common zone Z′. As an alternate arrangement, the belt 31′ of the FIG. 14 embodiment may be made of ray transparent material to permit exposure of a radiation sandwich to infrared and ultraviolet rays respectively applied at the opposite sides of the sandwich as the same is carried around the sleeve 29′ by a ray transparent belt 31′. Where the sleeve 29′ is transparent to infrared rays, the belt being transparent to ultraviolet rays, an infrared ray emitting lamp and associated reflector may be mounted within the sleeve 29′, as in the lamp and reflector position illustrated in solid lines in FIG. 14, while an ultraviolet ray emitting lamp and its associated reflector may be mounted within the housing 21′, outwardly of the sleeve 29′ and belt 31′, as in the lamp and reflector position shown in dashed lines at L′ and N′. If desired, the ultraviolet lamp may be disposed within the sleeve 29′ while the infrared lamp is mounted outwardly of the sleeve and belt. In such case, the belt and sleeve respectively may comprise materials transparent to infrared and ultraviolet radiation.

It will be appreciated, of course, that, where a lamp is mounted outwardly of the sleeve and belt in the dashed line position shown at L′ and N′, a cooperating lamp and reflector mounted within the sleeve 29′ may be mounted in either of the positions shown in dotted and in dot-and-dash lines, as well as in the position shown in solid lines, in order to obtain any desired sequence of sandwich exposure to infrared and ultraviolet radiation. Where an infrared lamp is mounted outwardly of the sleeve 29′ and the belt, in the position shown in dashed lines at L′ and N′ in the FIG. 14 embodiment, it will be understood that an ultraviolet lamp mounted within the sleeve 29′, may, if desired, be associated with a reflector of the sort shown in FIG. 10, in order to subject the radiation sandwich to the action of stabilizing rays, applied to the copying sheet through the master M, continuously throughout the travel of the sandwich on the sleeve, both before, during and after exposure of the sandwich to the developing action of infrared radiation applied through the belt 31′.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. Apparatus for making copies of graphic material on a ray sensitive copying sheet containing a diazo compound, an azo coupling component and a substance capable of evolving an azo developing medium when heated, comprising means forming a source of radiation containing ultraviolet rays, means forming an infrared ray emitting source, and carrying means for supporting, in stacked sandwich forming relation, a copying sheet and a graphic original carrying graphic material to be copied, said carrying means serving to support the sandwich in position to receive the impact of infrared rays emitted by said source upon the graphic material to be copied, to thereby heat the same to a temperature sufficient to cause evolution of the developing medium, in azo developing quantities, in the areas of the copying sheet in registration with the heated portions of the graphic original to be copied, and then in position to expose the sensitive copying sheet to ultraviolet rays emitted by said source of radiation.

2. Apparatus for making copies of graphic material on a ray sensitive copying sheet containing a diazo compound, an azo coupling component and a substance capable of evolving an azo developing medium when heated, comprising means forming a source of radiation containing ultraviolet rays, means forming an infrared ray emitting source, and carrying means for supporting, in stacked sandwich forming relation, a copying sheet and a graphic original carrying graphic material to be copied, said carrying means serving to support the sandwich in position to receive the impact of infrared rays emitted by said source upon the graphic material to be copied, to thereby heat the same to a temperature sufficient to cause evolution of the developing medium, in azo developing quantities, in the areas of the copying sheet in registration with the heated portions of the graphic original to be copied, and simultaneously to expose the sensitive copying sheet to the action of ultraviolet rays applied thereto through the graphic original.

3. Apparatus for making copies of graphic material on a ray sensitive copying sheet containing a diazo compound, an azo coupling component and a subtance capable of evolving an azo developing medium when heated, comprising a housing having inlet and outlet openings, ultraviolet and infrared ray emitting lamps mounted in position in said housing to apply lamp emitted rays in corresponding ultraviolet and infrared ray exposure zones in said hosuing, and sheet carrying means for receiving, at said inlet opening, in stacked relation forming an exposure sandwich, components including a copying sheet and a graphic original carrying graphic material to be copied, said carrying means serving to travel the sandwich through the infrared ray exposure zone in position to receive the impact of infrared rays on the graphic material to be copied, to thereby heat the same to a temperature sufficient to cause evolution of the developing medium in azo developing quantities in areas of the copying sheet in registration with the heated portions of the graphic original to be copied, and also to travel the copying sheet through the ultraviolet ray exposure zone, wherein provision is made for separating the sandwich components after exposure thereof to infrared rays and for applying ultraviolet rays directly to the copying sheet.

4. Apparatus for making copies of graphic material on a ray sensitive copying sheet containing a diazo compound, an azo coupling component and a subtance capable of evolving an azo developing medium when heated, comprising a housing having inlet and outlet openings, ultraviolet and infrared ray emitting lamps mounted in position in said housing to apply lamp emitted rays in corresponding ultraviolet and infrared ray exposure zones in said housing, and sheet carrying means for receiving, at said inlet opening, in stacked relation forming an exposure sandwich, components including a copying sheet and a graphic original carrying graphic material to be copied, said carrying means serving to travel the sandwich through the infrared ray exposure zone in position to receive the impact of infrared rays on the graphic material to be copied, to thereby heat the same to a temperature sufficient to cause evolution of the developing medium in azo developing quantities in areas of the copying sheet in registration with the heated portions of the graphic original to be copied, and also to travel the copying sheet through the ultraviolet ray exposure zone, wherein the carrying means comprises a turnable ray transparent sleeve, and a movable ray transparent belt having a portion in engagement with the sleeve, the ray sources being disposed respectively within the sleeve and outwardly of the belt in position to apply rays outwardly through the sleeve and upon an exposure sandwich held against the outer surface of the sleeve by the belt, and inwardly upon the sandwich through the belt.

References Cited by the Examiner

UNITED STATES PATENTS

| | | | |
|---|---|---|---|
| 2,597,306 | 5/1952 | Eaton. | |
| 2,680,062 | 6/1954 | Sus | 41—41 |
| 2,740,895 | 4/1956 | Miller | 41—41 X |
| 2,770,534 | 11/1956 | Marx | 250—65 |
| 2,774,290 | 12/1956 | Mormann | 95—77.5 |
| 2,789,904 | 4/1957 | Benbrook et al. | 96—49 |
| 2,849,298 | 8/1958 | Werberig | 41 |
| 2,918,857 | 12/1959 | Frantz | 95—77.5 |
| 2,921,513 | 1/1960 | Frantz | 95—77.5 |
| 2,927,210 | 3/1960 | O'Mara | 250—65.1 |
| 2,983,210 | 5/1961 | Baril et al. | 95—77.5 |
| 3,060,828 | 10/1962 | Ackermann | 95—77.5 |
| 3,076,707 | 2/1963 | Lawton | 96—49 X |
| 3,113,865 | 12/1963 | Sagura | 96—49 |

RALPH G. NILSON, *Primary Examiner.*

ARTHUR P. KENT, *Examiner.*